United States Patent
Zhang

(10) Patent No.: US 9,207,394 B2
(45) Date of Patent: Dec. 8, 2015

(54) LIQUID CRYSTAL MODULE

(71) Applicant: Shenzhen China Star Optoelectronics Technology Co., Ltd., Shenzhen, Guangdong (CN)

(72) Inventor: Yanxue Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 230 days.

(21) Appl. No.: 13/817,685

(22) PCT Filed: Jan. 4, 2013

(86) PCT No.: PCT/CN2013/070018
§ 371 (c)(1),
(2) Date: Feb. 19, 2013

(87) PCT Pub. No.: WO2014/101305
PCT Pub. Date: Jul. 3, 2014

(65) Prior Publication Data
US 2014/0198280 A1 Jul. 17, 2014

(51) Int. Cl.
*G02F 1/1335* (2006.01)
*F21V 8/00* (2006.01)

(52) U.S. Cl.
CPC .......... *G02B 6/0091* (2013.01); *G02B 6/0085* (2013.01)

(58) Field of Classification Search
CPC .................................................. G02B 6/0023
See application file for complete search history.

(56) References Cited

U.S. PATENT DOCUMENTS

| | | | | |
|---|---|---|---|---|
| 5,788,356 | A * | 8/1998 | Watai et al. | 362/621 |
| 2003/0081402 | A1* | 5/2003 | Jeon et al. | 362/26 |
| 2007/0081360 | A1* | 4/2007 | Bailey et al. | 362/610 |
| 2008/0170174 | A1* | 7/2008 | Nishiyama | 349/62 |
| 2008/0232135 | A1* | 9/2008 | Kinder et al. | 362/615 |
| 2009/0108283 | A1* | 4/2009 | Kadotani et al. | 257/98 |
| 2010/0085772 | A1* | 4/2010 | Song et al. | 362/612 |
| 2011/0063875 | A1* | 3/2011 | Yang et al. | 362/621 |
| 2013/0128189 | A1* | 5/2013 | Hu et al. | 349/65 |
| 2013/0128617 | A1* | 5/2013 | Lee | 362/611 |
| 2013/0182456 | A1* | 7/2013 | Chin | 362/608 |
| 2013/0336003 | A1* | 12/2013 | Yang et al. | 362/608 |

FOREIGN PATENT DOCUMENTS

CN 102392963 A * 3/2012

* cited by examiner

*Primary Examiner* — Richard Kim
*Assistant Examiner* — Ryan Crockett
(74) *Attorney, Agent, or Firm* — Andrew C. Cheng

(57) ABSTRACT

A liquid crystal module is disclosed. The liquid crystal module includes a light source, a light guiding device, and a coupling device. The light guiding device is arranged at a light emitting side of the light source and is spaced apart from the light guiding device by a distance. The coupling device is installed between the light source and the light guiding device for controlling a coupling distance therebetween. The coupling device keeps the coupling distance between a light guiding plate and a light source to remain a predetermined value. In this way, the coupling efficiency of the liquid crystal module is not affected by the difference of LEDs or heat inflation so as to enhance the coupling efficiency.

11 Claims, 4 Drawing Sheets

LIQUID CRYSTAL MODULE

BACKGROUND OF THE INVENTION

This application claims priority to China Patent Application No. 201210573473.1 filed on Dec. 26, 2012 entitled, LIQUID CRYSTAL MODULE, all of the disclosures of which are incorporated herein by reference in their entirety.

FIELD OF THE INVENTION

Embodiments of the present disclosure relate to liquid crystal display technology, and more particularly to a liquid crystal module.

DISCUSSION OF THE RELATED ART

Liquid crystal devices include display modules for displaying images, and backlight modules are needed to provide light sources. Currently, Cold Cathode Fluorescent Lamp (CCFL) and Light Emitting Diode (LED) are adopted as backlight modules. As LEDs have the attributes of high brightness and low power consumption, the LEDs will be adopted more and more in the future.

Light guiding plates are generally adopted as light guiding components for edge type LED liquid crystal module. In product design, the distance between the light guiding plate and LED light source may affect the coupling efficiency of the liquid crystal module. For example, the coupling efficiency may degrade when the distance between the light guiding plate and the LED is huge. On the other hand, a small distance between the light guiding plate and LED may result in light leakage or the light guiding plate may be melt down.

Therefore, it is critical to design the coupling distance between the light guiding plate and the LED light source.

SUMMARY

The object of the claimed invention is to provide a liquid crystal module to keep the coupling distance between a light guiding plate and a light source to remain a predetermined value. In this way, the coupling efficiency of the liquid crystal module is enhanced.

In one aspect, a liquid crystal module include: a light source and a light guiding device, the light guiding device is arranged at a light emitting side of the light source and is spaced apart from the light guiding device by a distance; a coupling device installed between the light source and the light guiding device for controlling a coupling distance between the light source and the light guiding device; and a first side of the coupling device facing toward the light source abuts against the light source, and the coupling device includes a substantially I-shaped, T-shaped, or L-shaped cross section.

Wherein a first groove is formed on the first side of the coupling device, the light source is received in the first groove, and at least one wall of the first groove contacts with the light source.

Wherein a second side of the coupling device facing away the light source abuts against the light guiding device.

Wherein a second groove is formed on the second side to receive an edge portion of the light guiding device, and at least one wall of the second groove contacts with the light guiding device.

In another aspect, a liquid crystal module include: a light source and a light guiding device, the light guiding device is arranged at a light emitting side of the light source and is spaced apart from the light guiding device by a distance; a coupling device installed between the light source and the light guiding device for controlling a coupling distance between the light source and the light guiding device, the first side of the coupling device abuts against the light source; the light source includes at least two sections, a fixing space is arranged between the two sections, and the coupling device is installed between the fixing spaces; and a top of the coupling device is higher than a light emitting surface of the light source.

Wherein an edge portion of the light guiding device contacts with the top of the coupling device.

Wherein: the coupling device includes two blocks at two ends, and the two blocks includes rectangular-shaped cross sections; and the coupling device is made by the same material and the same injection molding processes with the light guiding device.

Wherein the coupling device is substantially U-shaped.

Wherein at least one wall of the coupling device contacts with the light source.

In another aspect, a liquid crystal module include: a light source and a light guiding device, the light guiding device is arranged on a light emitting side of the light source and is spaced apart from the light guiding device by a distance; and a coupling device installed between the light source and the light guiding device for controlling a coupling distance between the light source and the light guiding device.

Wherein a first side of the coupling device facing toward the light source abuts against the light source.

Wherein a first groove is formed on the first side of the coupling device, the light source is received in the first groove, and at least one wall of the first groove contacts with the light source.

Wherein a second side of the coupling device facing away the light source abuts against the light guiding device.

Wherein a second groove is formed on the second side to receive an edge portion of the light guiding device, and at least one wall of the second groove contacts with the light guiding device.

Wherein the coupling device includes a substantially I-shaped, T-shaped, or L-shaped cross section.

Wherein: the light source includes at least two sections, a fixing space is arranged between the two sections, and the coupling device is installed between the fixing spaces; and a top of the coupling device is higher than a light emitting surface of the light source.

Wherein an edge portion of the light guiding device contacts with the top of the coupling device.

Wherein: the coupling device includes two blocks at two ends, and the two blocks includes rectangular-shaped cross sections; and the coupling device is made by the same material and the same injection molding processes with the light guiding device.

Wherein the coupling device is substantially U-shaped, and at least one wall of the coupling device contacts with the light source.

DETAILED DESCRIPTION OF THE EMBODIMENTS

Embodiments of the invention will now be described more fully hereinafter with reference to the accompanying drawings, in which embodiments of the invention are shown.

Figure 1:
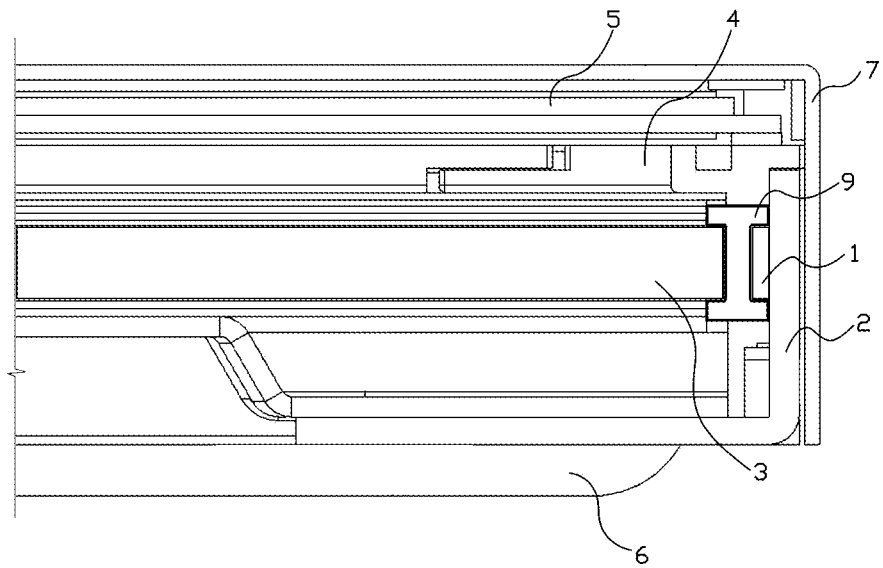
FIG. 1 is a schematic view of the structure of a liquid crystal module in accordance with a first embodiment.
Figure 2:
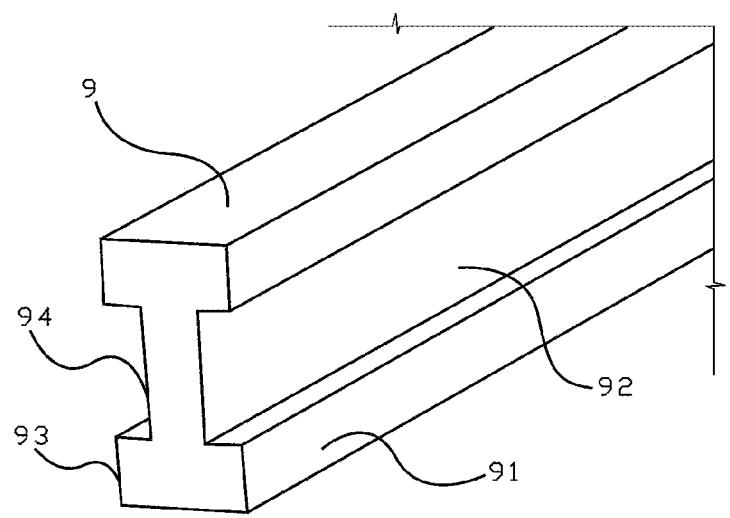
FIG. 2 is a perspective view of the coupling device of FIG. 1.
Figure 3:
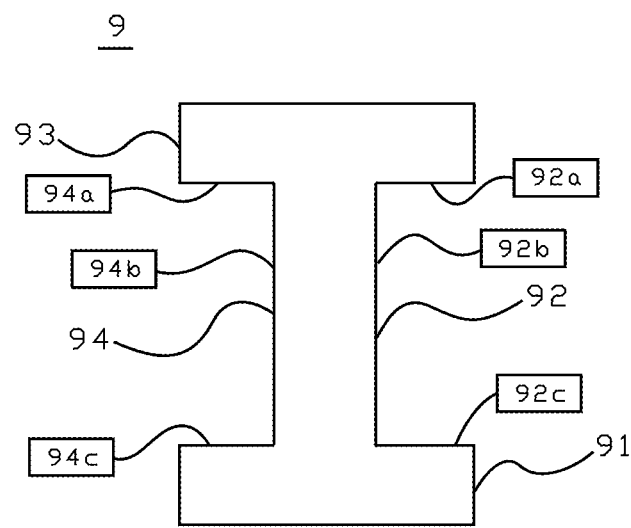
FIG. 3 is a cross sectional view of the coupling device of FIG. 1.

FIGS. 1 to 3 show the liquid crystal module of the first embodiment.

FIG. 1 is a schematic view of the structure of a liquid crystal module in accordance with a first embodiment. The liquid crystal module includes a light source 1, a heat dissipation device 2, a light guiding device 3, a plastic frame 4, a liquid crystal glass 5, a back plate 6, a front frame 7, and a coupling device 9.

The light source 1 may be LEDs or a LED light bar. The LEDs or the LED light bar is arranged in an internal side of the heat dissipation device 2. In one embodiment, the heat dissipation device 2 may be a bent aluminum extrusion.

The heat dissipation device 2 connects to the back plate 6.

The plastic frame 4 is fixed on the heat dissipation device 2 and on optical components including the light guiding device 3. The optical components may be a diffusion plate, a prism, and so on.

The liquid crystal glass 5 is fixed by the plastic frame 4 and the front frame 7.

In one embodiment, the light guiding device 3 may be a light guiding plate fixed on one side facing toward the light source 1. In addition, the light guiding device 3 is spaced apart from the light source 1 by a certain distance. The light guiding may be an acrylic body made by an injection molding process.

In the embodiment, the coupling device 9 is installed between the light source 1 and the light guiding device 3. The coupling device 9 may be a bar-shaped structure with an I-shaped cross section. The coupling device 9 may be made by the same material and same process with the light guiding plate. As such, the light emission of the light source 1 is not affected by the coupling device 9 during the assembly process. In addition, the coupling device 9 and the light guiding plate may be manufactured in the same process so that the manufacturing cost is reduced.

In the embodiment, a first lateral side of the coupling device 9 facing toward the light source 1 abuts against the light source 1.

FIGS. 2 and 3 are perspective view and cross section view of the coupling device in accordance with the first embodiment. A first groove 92 is formed on a first side 91 of the coupling device 9. The first groove 92 faces toward the LED light bar. The width and the height of the first groove 92 are substantially the same with that of the LED light bar such that the LED light bar may be received in the first groove 92. In addition, a second side 93 of coupling device 9 faces toward the light guiding plate. During the assembly process, the second side 93 may contact with the light guiding plate or may be spaced apart from the light guiding plate by a certain distance.

The second side 93 has three walls 92a, 92b, and 92c. In the embodiment, at least one wall 92a, 92b, or 92c contacts with the LED light bar, and the rest of the walls are spaced apart from the LED light bar by a certain distance. In this way, the coupling efficiency of the liquid crystal module is not affected by the heat inflation of the coupling device 9. In other embodiments, the three walls 92a, 92b, and 92c may be configured to contact with the LED light bar while the heat inflation of the coupling device 9 is controllable.

In addition, the assembly between the coupling device 9 and the three walls 92a, 92b, and 92c may be welding or pasting.

In the embodiment, a second side 93 of the coupling device 9 facing away the light source 1 abuts against the light guiding device 3.

In addition, a second groove 94 is formed on the second side 93 of the coupling device 9. The second groove 94 is symmetrical to the first groove 92. The second groove 94 may receive an edge portion of the light guiding plate and may preserve the space for the heat inflation of the coupling device 9.

Specifically, the second groove 94 includes three walls 94a, 94b, and 94c. In one embodiment, at least one wall contacts with the edge portion of the light guiding plate, and the other walls are spaced apart from the edge portion 31 by a certain distance.

In view of the above, the coupling device 9 may keep the coupling distance between the light guiding plate and the light source to remain a predetermined value when the dimensions of the light guiding plate or the LED light source are different or when the coupling distance changes due to heat inflation of the light guiding plate, the coupling device 9.

Figure 4:
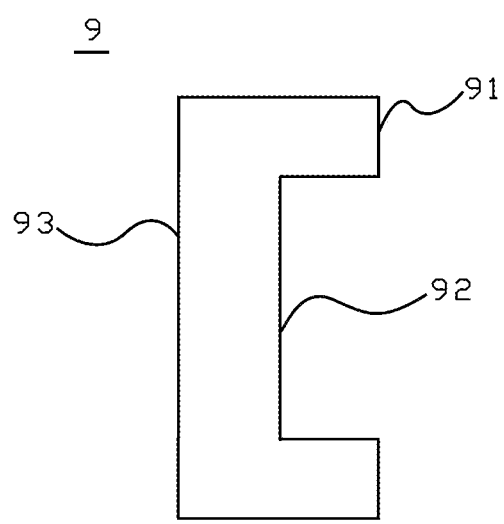
FIG. 4 is a cross sectional view of the coupling device in accordance with a second embodiment.

FIG. 4 is a cross sectional view of the coupling device in accordance with a second embodiment. As shown, only the first groove 92 is formed on the first side 91 of the coupling device 9. That is, the second side 93 is a planar surface without a groove formed thereon. In the assembly process, the second side 93 abuts against the light guiding plate.

Figure 5:
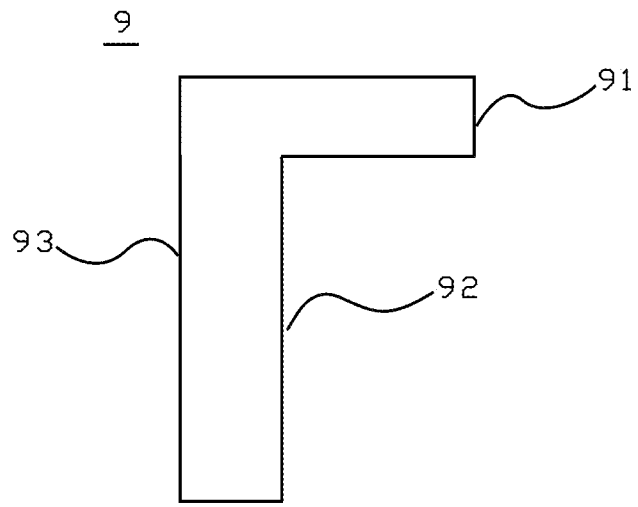
FIG. 5 is a cross sectional view of the coupling device in accordance with a third embodiment.

FIG. 5 is a cross sectional view of the coupling device in accordance with a third embodiment. In the embodiment, the coupling device 9 includes an L-shaped cross section. The first side 91 having a bent portion abuts against the LEDs, and the second side 93 is a planar surface abutting against the light guiding plate.

Figure 6:
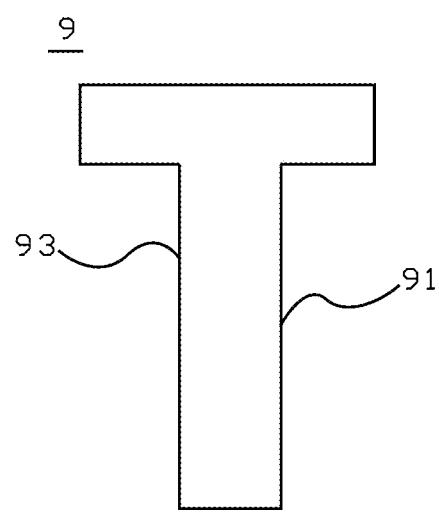
FIG. 6 is a cross sectional view of the coupling device in accordance with a fourth embodiment.

FIG. 6 is a cross sectional view of the coupling device in accordance with a fourth embodiment. In the embodiment, the coupling device 9 includes a T-shaped cross section. The two sides of the coupling device 9 both include bent portions. Two walls 91, 93 of the coupling device 9 abut against the LEDs and the light guiding plate.

Figure 7:
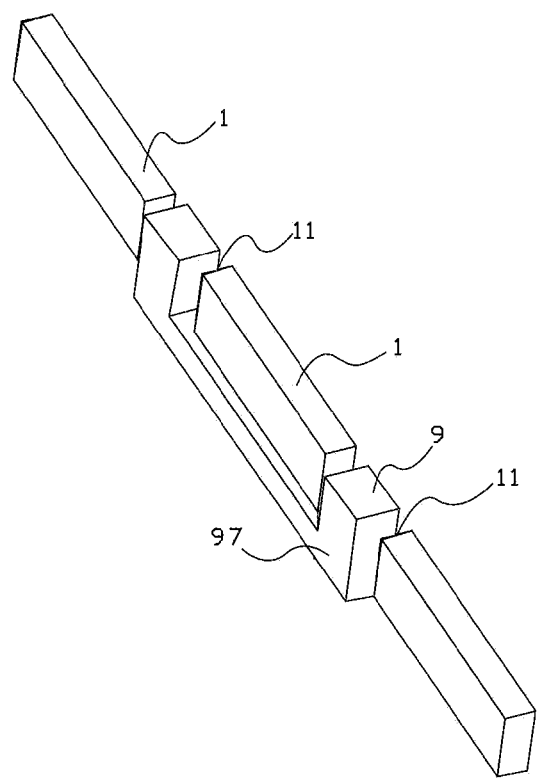
FIG. 7 is a schematic view of the LED light bar assembled with the coupling device in accordance with a fifth embodiment.

FIG. 7 is a schematic view of the LED light bar assembled with the coupling device in accordance with a fifth embodiment. In the embodiment, the LED light bar includes three sections. One fixing space 11 is arranged between two LED sections. The coupling device 9 is installed between the fixing spaces 11.

Figure 8:
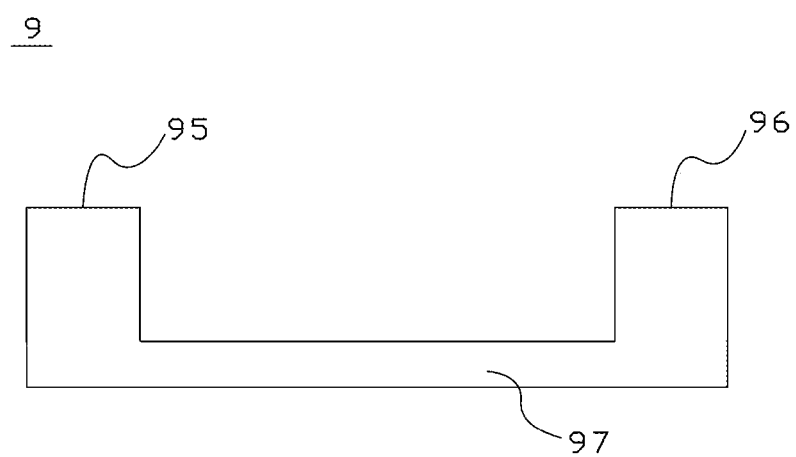
FIG. 8 is a cross sectional view of the coupling device of the fifth embodiment.

As shown in FIG. 8, the coupling device 9 is substantially a U-shaped structure. The coupling device 9 includes two blocks 95, 96 at two ends, and the two blocks 95, 96 have rectangular-shaped cross sections. The thickness of the blocks 95, 96 are larger than the height of the LEDs. When the blocks 95, 96 are installed within the fixing space 11, a top 97 of the coupling device 9 is higher than the light emitting surface of the LED, and the top 97 of the coupling device 9 abuts against the edge portion of the light guiding plate.

As the top 97 of the coupling device 9 is higher than the light emitting surface of the LED, the heat inflation of the light guiding device 3 will only affect the second side of the coupling device 9. That is, the heat inflation of the light guiding device 3 will not affect the coupling distance between the LED and the light guiding plate.

In the embodiment, at least one wall of the coupling device 9 contacts with the light source. The coupling device 9 may be made by the same material and process with the light guiding plate. The LEDs may be assembled by welding or pasting.

In view of the above, the coupling device 9 is capable of keep the coupling distance between a light guiding plate and a light source to remain a predetermined value. In this way, the coupling efficiency of the liquid crystal module is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal module, comprising:
    a light source and a light guiding device, the light guiding device is arranged at a light emitting side of the light source and is spaced apart from the light guiding device by a distance;
    a coupling device installed between the light source and the light guiding device for controlling a coupling distance between the light source and the light guiding device; and
    a first side of the coupling device facing toward the light source abuts against the light source, and the coupling device comprises a substantially I-shaped, T-shaped, or L-shaped cross section; and
    wherein a first groove is formed on the first side of the coupling device, a second groove is formed on a second side of the coupling device to receive an edge portion of the light guiding device, the second groove is symmetrical to the first groove, and at least one wall of the second groove contacts with the light guiding device.

2. The liquid crystal module as claimed in claim 1, wherein the light source is received in the first groove, and at least one wall of the first groove contacts with the light source.

3. The liquid crystal module as claimed in claim 2, wherein the second side of the coupling device facing away the light source abuts against the light guiding device.

4. A liquid crystal module, comprising:
    a light source and a light guiding device, the light guiding device is arranged on a light emitting side of the light source and is spaced apart from the light guiding device by a distance; and
    a coupling device installed between the light source and the light guiding device, a first groove is formed on a first side of the coupling device, and the light source is received in the first groove, a second groove is formed on a second side to receive an edge portion of the light guiding device, the second groove is symmetrical to the first groove;
    wherein the first side of the coupling device facing toward the light source abuts against the light source.

5. The liquid crystal module as claimed in claim 4, wherein at least one wall of the first groove contacts with the light source.

6. The liquid crystal module as claimed in claim 5, wherein the second side of the coupling device facing away the light source abuts against the light guiding device.

7. The liquid crystal module as claimed in claim 6, wherein at least one wall of the second groove contacts with the light guiding device.

8. The liquid crystal module as claimed in claim 7, wherein the coupling device comprises a substantially I-shaped, T-shaped, or L-shaped cross section.

9. The liquid crystal module as claimed in claim 4, wherein:
    the light source comprises at least two sections, a fixing space is arranged between the two sections, and the coupling device is installed between the fixing spaces; and
    a top of the coupling device is higher than a light emitting surface of the light source.

10. The liquid crystal module as claimed in claim 9, wherein an edge portion of the light guiding device contacts with the top of the coupling device.

11. The liquid crystal module as claimed in claim 10, wherein:
    the coupling device comprises two blocks at two ends, and the two blocks comprises rectangular-shaped cross sections; and
    the coupling device is made by the same material and the same injection molding processes with the light guiding device.

* * * * *